United States Patent
Brandt et al.

(10) Patent No.: US 9,886,395 B2
(45) Date of Patent: *Feb. 6, 2018

(54) EVICTING CACHED STORES

(71) Applicant: International Business Machines Corporation, Armonk, NY (US)

(72) Inventors: Uwe Brandt, Boeblingen (DE); Willm Hinrichs, Holzgerlingen (DE); Walter Lipponer, Ammerbuch (DE); Martin Recktenwald, Schoenaich (DE); Hans-Werner Tast, Weil im Schoenbuch (DE)

(73) Assignee: International Business Machines Corporation, Armonk, NY (US)

( * ) Notice: Subject to any disclaimer, the term of this patent is extended or adjusted under 35 U.S.C. 154(b) by 55 days.

This patent is subject to a terminal disclaimer.

(21) Appl. No.: 14/939,052

(22) Filed: Nov. 12, 2015

(65) Prior Publication Data

US 2016/0070654 A1    Mar. 10, 2016

Related U.S. Application Data

(63) Continuation of application No. 14/314,461, filed on Jun. 25, 2014, now Pat. No. 9,658,967.

(51) Int. Cl.
*G06F 12/00* (2006.01)
*G06F 12/121* (2016.01)
*G06F 12/0891* (2016.01)

(52) U.S. Cl.
CPC ........ *G06F 12/121* (2013.01); *G06F 12/0891* (2013.01); *G06F 2212/69* (2013.01)

(58) Field of Classification Search
CPC .................. G06F 12/0891; G06F 2219/69
See application file for complete search history.

(56) References Cited

U.S. PATENT DOCUMENTS 7,096,320 B2   8/2006   Gaither et al.
7,512,737 B2   3/2009   Petev et al.
(Continued)

OTHER PUBLICATIONS

"Cache Eviction Algorithms", Ehcache, downloaded May 21, 2014, <http://ehcache.org/documentation/apis/cache-eviction-algorithms>.
(Continued)

*Primary Examiner* — Charles Rones
*Assistant Examiner* — Nanci Wong
(74) *Attorney, Agent, or Firm* — Maeve Carpenter; Alexander G. Jochym

(57) ABSTRACT

A tool for determining eviction of store cache entries based on store pressure. The tool determines, by one or more computer processors, a count value for one or more new store cache entry allocations. The tool determines whether a new store cache entry allocation limit is exceeded. Responsive to determining the new store cache entry allocation limit is exceeded, the tool determines an allocation value for one or more existing store cache entries, the allocation value indicating an allocation class for each of the one or more existing store cache entries. The tool determines based, at least in part, on the allocation value for the one or more existing store cache entries, at least one allocation class for eviction. The tool program determines an eviction request setting for evicting the one or more existing store cache entries.

7 Claims, 4 Drawing Sheets

(56) References Cited

U.S. PATENT DOCUMENTS

| | | | |
|---|---|---|---|
| 7,539,821 B2 | 5/2009 | Petev et al. | |
| 7,899,994 B2* | 3/2011 | Zhao | G06F 12/126 |
| | | | 711/133 |
| 7,971,001 B2 | 6/2011 | Petev et al. | |
| 8,402,223 B2 | 3/2013 | Birka et al. | |
| 8,533,393 B1* | 9/2013 | Cote | G06F 12/0804 |
| | | | 711/118 |
| 2003/0084249 A1 | 5/2003 | Johnson et al. | |
| 2008/0235457 A1* | 9/2008 | Hasenplaugh | G06F 12/0842 |
| | | | 711/130 |
| 2008/0313407 A1* | 12/2008 | Hu | G06F 12/0811 |
| | | | 711/133 |
| 2012/0159502 A1* | 6/2012 | Levin | G06F 9/5016 |
| | | | 718/104 |
| 2012/0198174 A1* | 8/2012 | Nellans | G06F 12/0804 |
| | | | 711/133 |
| 2013/0124802 A1 | 5/2013 | Glasco et al. | |
| 2013/0151780 A1* | 6/2013 | Daly | G06F 12/0897 |
| | | | 711/122 |
| 2015/0081982 A1* | 3/2015 | Warner | G06F 13/1673 |
| | | | 711/136 |

OTHER PUBLICATIONS

U.S. Appl. No. 14/314,461, filed Jun. 25, 2014, —A Copy of This Document Is Not Provided Because It Is Readily Available to the Examiner.
List of IBM Patents or Patent Applications Treated as Related (Appendix P), filed herewith.

* cited by examiner

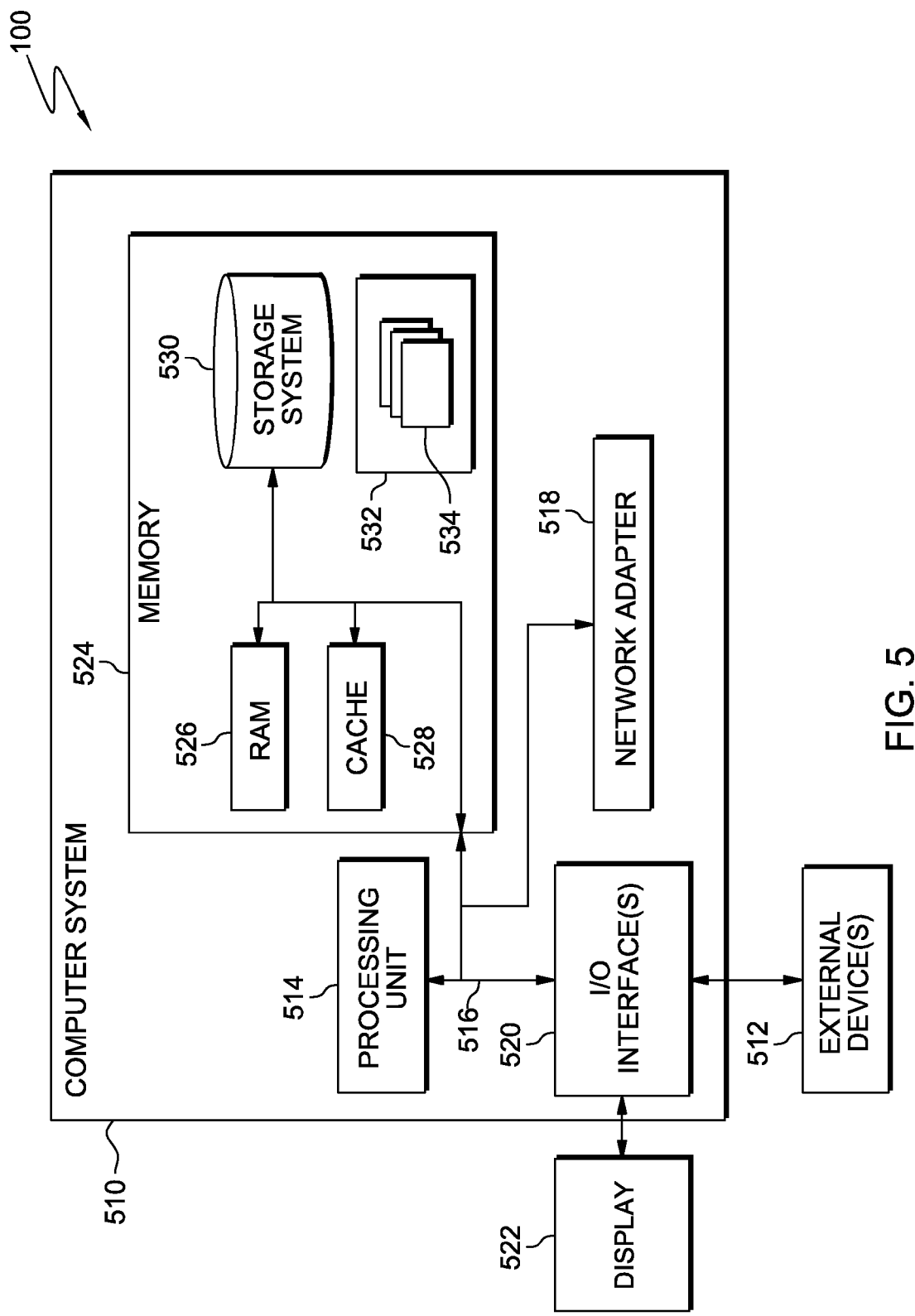

EVICTING CACHED STORES

BACKGROUND OF THE INVENTION

The present invention relates generally to store caches, and more particularly to evicting cached stores based on store pressure.

A computer processor can handle stores at a very high rate. The high store rate is bandwidth limited at the interface between an L2 level cache and an L3 level cache. To reduce the effects of a limited bandwidth, stores are cached between a load store unit (LSU) and the L2 level cache in a store cache. Multiple stores are collected in the store cache prior to being executed to the next lower cache level (i.e., L2 level cache and L3 level cache). The length of time a store resides in the store cache prior to being evicted is determined by a variety of factors. Typically, touch information and time are two criteria used to determine evictions of stores.

SUMMARY

Aspects of an embodiment of the present invention disclose a method, system, and a computer program product for determining eviction of store cache entries based on store pressure. The method includes determining, by one or more computer processors, a count value for one or more new store cache entry allocations. The method includes determining, by one or more computer processors, whether a new store cache entry allocation limit is exceeded. The method includes responsive to determining the new store cache entry allocation limit is exceeded, determining, by one or more computer processors, an allocation value for one or more existing store cache entries, the allocation value indicating an allocation class for each of the one or more existing store cache entries. The method includes determining, by one or more computer processors based, at least in part, on the allocation value for the one or more existing store cache entries, at least one allocation class for eviction. The method includes determining, by one or more computer processors, an eviction request setting for evicting the one or more existing store cache entries.

BRIEF DESCRIPTION OF THE SEVERAL VIEWS OF THE DRAWINGS

FIG. 5 is a block diagram depicting components of a data processing system, in accordance with an embodiment of the present invention.

DETAILED DESCRIPTION

Embodiments of the present invention recognize that current methods for evicting cached stores involve using read/write access and age bytes (i.e., touch information and time) to determine the least recently used cache entry. Embodiments of the present invention recognize that determining the least recently used cache entry is expensive in hardware, since every time a cache line is used, the age of all other cache entries needs to be changed.

Embodiments of the present invention provide the capability to evict store cache entries based on store pressure. Embodiments of the present invention provide the capability to determine staleness of a store cache entry by the number of new store cache entry allocations, rather than by age of existing store cache entries. Embodiments of the present invention provide the capability to assign an allocation value to existing store cache entries. All store cache entries sharing the same allocation value make up an allocation class. Embodiments of the present invention provide the capability to determine the existence of all possible allocation classes and evict the highest allocation class first, prior to evicting any other allocation classes.

Implementation of such embodiments may take a variety of forms, and exemplary implementation details are discussed subsequently with reference to the Figures.

Figure 1:
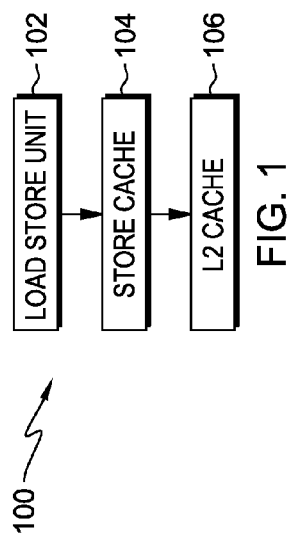
FIG. 1 is a functional block diagram illustrating a data processor, generally designated 100, in accordance with an embodiment of the present invention.

The present invention will now be described in detail with reference to the Figures. FIG. 1 is a functional block diagram illustrating a data processor, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Data processor 100 includes load store unit 102, store cache 104, and L2 cache 106.

In the exemplary embodiment, load store unit 102 is a specialized hardware component that loads data from memory or stores data back to memory from one or more registers. Load store unit 102 includes a queue that acts as a waiting area for memory instructions. Load store unit 102 operates independently of other processor units. In the exemplary embodiment, load store unit 102 caches one or more stores in store cache 104 before the one or more stores are written (i.e., executed) to the next lower cache level, such as L2 cache 106, thereby reducing the effects of a limited bandwidth between L2 cache 106 and an L3 cache (not shown).

In the exemplary embodiment, store cache 104 is a hardware component that transparently stores data to enable future requests for the data to be provided faster. The data that is stored within store cache 104 can be values that have been computed earlier, or duplicates of original values that are stored elsewhere. When requested data is contained in the cache (i.e., a cache hit), the requested data can be provided by simply reading store cache 104. In the exemplary embodiment, store cache 104 is a hardware component that provides the capability to perform one or more functions for evicting store cache entries. In the exemplary embodiment, store cache 104 receives one or more stores (i.e., store data) from load store unit 102. Store cache 104 allocates the store data to one or more store cache entries. The one or more store cache entries are defined by an allocation value. Store cache 104 determines the existence of one or more allocation classes, where each of the one or more allocation classes contains store cache entries having the same allocation value. For example, where two store cache entries, such as entry 01 and entry 02, each have an allocation value of 1, store cache 104 may determine that entry 01 and entry 02 are in allocation class 1. In the exemplary embodiment, store cache 104 evicts the one or more store cache entries when there is a high store pressure on the cache by evicting the highest allocation class first.

L2 cache 106 is a computer processing unit (CPU) cache, within a multi-level storage strategy, for improving computing performance. L2 cache 106 bridges the gap between a computer processing unit and random access memory (RAM). L2 cache 106 anticipates data requests to ensure the instructions required to run a program are ready, and stored in cache. When this happens, the CPU can process the request without delay, drastically improving computer performance.

Figure 2:
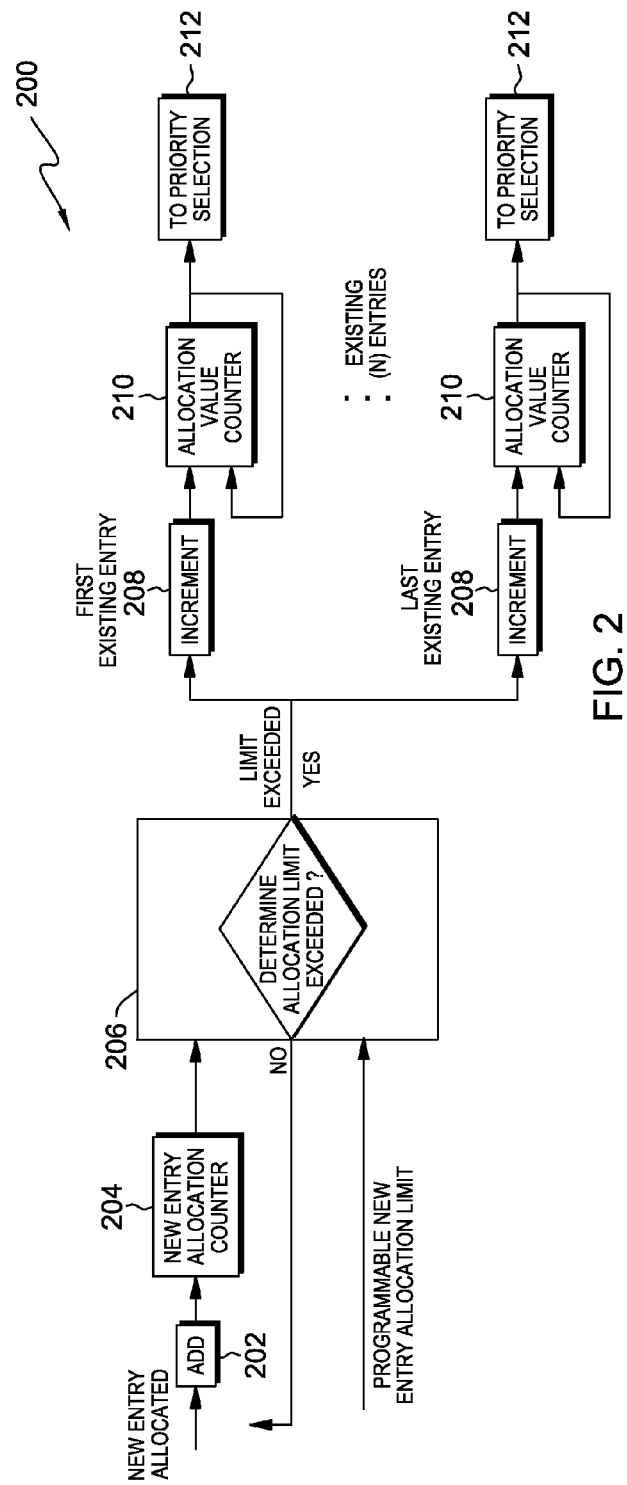
FIG. 2 is a flowchart of an exemplary process flow, generally designated 200, for counting and incrementing new store cache entries, in accordance with an embodiment of the present invention.

FIG. 2 is a flowchart of an exemplary process flow, generally designated 200, for counting and incrementing new store cache entries, in accordance with an embodiment of the present invention.

Store cache 104 allocates a new store cache entry (202). In the exemplary embodiment, in response to receiving a new store, store cache 104 determines index and set ID information associated with the new store. Store cache 104 utilizes the index and set ID information associated with the new store to determine whether an existing store (i.e., a store already cached in store cache 104) shares the same index and set ID information as the new store. If no existing store shares the same index and set ID information as the new store, then store cache 104 allocates a new store cache entry, and caches the new store into the new store cache entry. For example, if a store cache, such as store cache 104, contains a plurality of existing stores cached into three store cache entries (e.g., entry 01, entry 02, and entry 03), and a new store has dissimilar index and set ID information from the plurality of existing stores, then store cache 104 allocates a new store cache entry, such as entry 04, and caches the new store into the new store entry. In another embodiment, if an existing store shares the same index and set ID information as a new store, then store cache 104 caches the new store into the same store cache entry as the existing store sharing the same index and set ID information, and no new store cache entry is allocated.

Store cache 104 determines a count value for new store cache entry allocations (204). In the exemplary embodiment, store cache 104 determines a count value for new store cache entry allocations by counting the number of new store cache entry allocations. Store cache 104 utilizes a new entry allocation counter to count the number of new store cache entry allocations. Store cache 104 associates an allocation counter value of one to each new store cache entry allocation. The count value for new store cache entry allocations is determined by adding the allocation counter values for each of the new store cache allocations.

Store cache 104 determines whether a new store cache entry allocation limit is exceeded (206). In the exemplary embodiment, store cache 104 determines whether a new store cache entry allocation limit is exceeded by comparing the count value for new store cache entry allocations to a programmable new store cache entry allocation limit. The programmable new store cache entry allocation limit is a predetermined, hardware implemented, threshold value that, when exceeded, initiates an action, such as an incrementing of the allocation value for existing store cache entries. The programmable new store cache entry allocation limit dictates the number of new store cache entry allocations allowable before initiating an action (i.e., incrementing the allocation value of existing store cache entries). The greater the number of new store cache entry allocations, and the lower a programmable new store cache entry allocation limit, the sooner action may be initiated. For example, a programmable new store cache entry allocation limit of two is exceeded when a store cache, such as store cache 104, allocates a third new store cache entry. The allocation of the third new store entry exceeds the programmable new store cache entry allocation limit, thereby initiating an incrementing of the allocation value of existing store cache entries. In the exemplary embodiment, if store cache 104 determines the programmable new store cache entry allocation limit is not exceeded (206, NO branch), store cache 104 continues to allocate new store cache entries and determine a count value for the new store cache entries (202, 204).

In response to store cache 104 determining the programmable new store cache entry allocation limit is exceeded (206, YES branch), store cache 104 initiates an incrementing of existing store cache entries (208). In the exemplary embodiment, store cache 104 initiates an incremental increase of existing store cache entries by determining an allocation value for existing store cache entries. Each of the existing store cache entries has an allocation value associated with it, and as long as no action has been taken, each of the existing store cache entries allocation value is zero. When the programmable new store cache entry allocation limit is exceeded, store cache 104 increments the allocation value for each of the existing store cache entries by one. For example, where a programmable new store cache entry allocation limit is set at two, the allocation of a first new store cache entry and a second new store cache entry elicit no change in their associated allocation value (e.g., zero), as the programmable new store cache entry allocation limit has not yet been exceeded. The allocation of a third new store cache entry exceeds the programmable new store cache entry allocation limit, and as such, store cache 104 initiates an incrementing of the allocation values of each of the existing store cache entries, i.e., the first new store cache entry and the second store cache entry. Store cache 104 increments the allocation value of each of the existing store cache entries by one, thereby raising the allocation value of the first new store cache entry and the second new store cache entry to one. The allocation of a fourth new store cache entry elicits no change in the associated allocation values of existing store cache entries, as the programmable new store cache entry allocation limit has not yet been exceeded. The allocation of a fifth new store cache entry exceeds the programmable new store cache entry allocation limit, and as such, store cache 104 initiates an incrementing of the allocation values of each of the existing store cache entries (i.e., the first, the second, the third, and the fourth new store cache entries). Store cache 104 increments the allocation of each of the existing store cache entries by one, thereby raising the allocation value of the third and the fourth new store cache to one, and raising the allocation value of the first and the second new store cache entries to two. In the exemplary embodiment, if a new store cache entry is being written to an existing store cache entry, the allocation value of the existing store cache entry can be reset to zero. In the exemplary embodiment, if an existing store cache entry is evicted, the allocation value is reset to zero in preparation for future new store cache entry allocations. In the exemplary embodiment, a maximum allocation value can be set, such that once an existing store cache entry has reached the maximum allocation value, the existing store cache entry remains at the maximum allocation value, no longer subject to further incrementing, regardless of subsequent incrementing.

Store cache 104 determines the allocation value for each of the existing store cache entries (210). In the exemplary embodiment, store cache 104 determines the allocation value for each of the existing store cache entries by counting the number of times each of the existing store cache entries has been incremented. Store cache 104 utilizes an allocation value counter to count the allocation value for each of the existing store cache entries.

Store cache 104 sends the allocation values for each of the existing store cache entries for priority selection (212). In the exemplary embodiment, store cache 104 sends the allocation values for each of the existing store cache entries to priority selection to be monitored for eviction. Priority selection and an accompanying eviction request mechanism is discussed in further detail in subsequent Figures.

Figure 3:
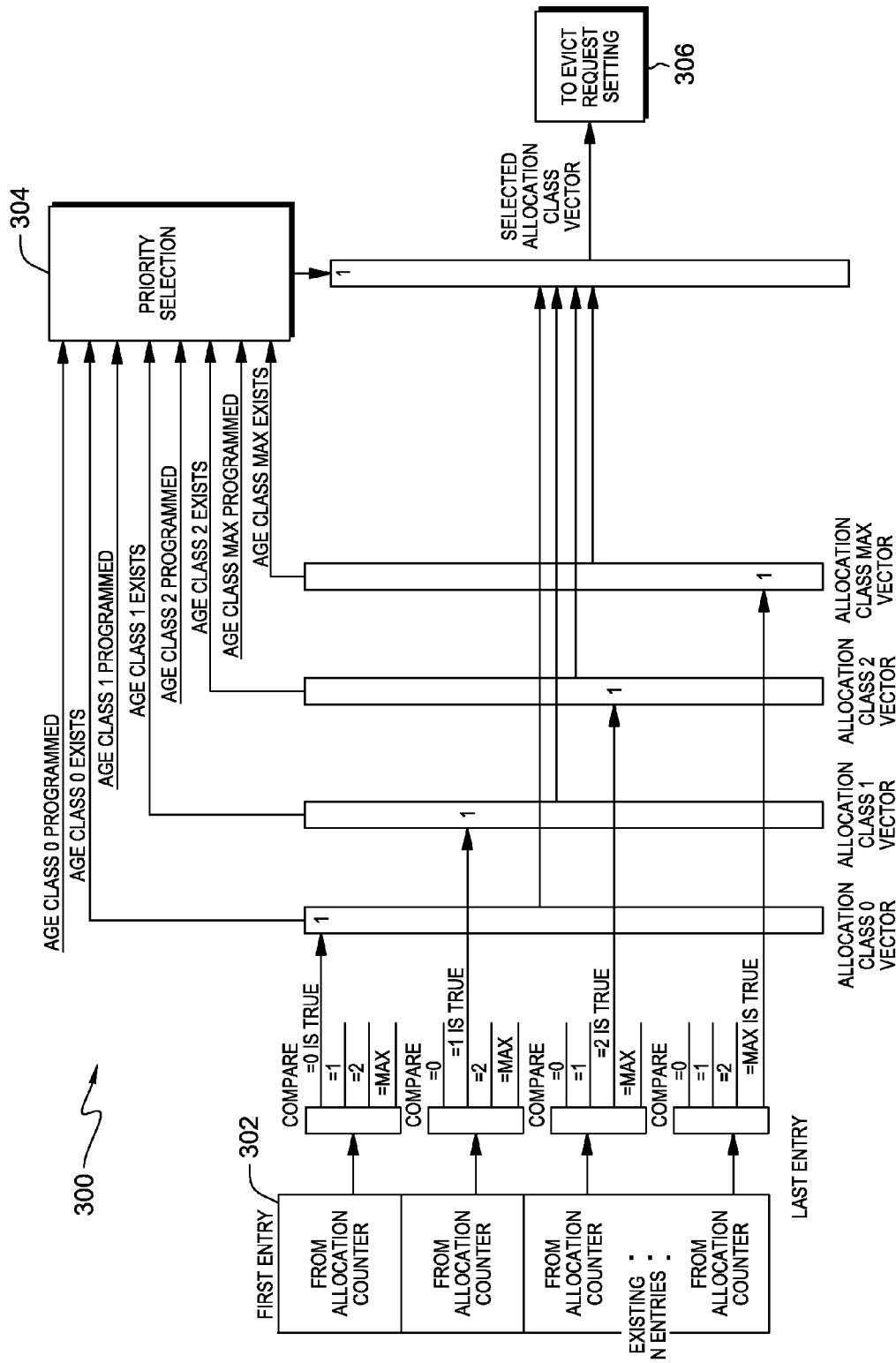
FIG. 3 is a functional block diagram, generally designated 300, illustrating a priority selection for evicting store cache entries, in accordance with an embodiment of the present invention.

FIG. 3 is a functional block diagram, generally designated 300, illustrating an eviction mechanism, including a priority selection, for evicting existing store cache entries, in accordance with an embodiment of the present invention.

Store cache 104 monitors each of the existing store cache entries for an allocation class (302). In the exemplary embodiment, store cache 104 monitors each of the existing store cache entries for an allocation class by determining the allocation value associated with each of the existing store cache entries. Store cache 104 utilizes a programmable allocation class picker to scan each of the existing store cache entries and retrieve the allocation value associated with each of the existing store cache entries. The allocation value associated with each of the existing store cache entries determines an allocation class for that existing store cache entry. Store cache 104 compares the allocation value associated with each of the existing store cache entries to a programmable maximum allocation value. An allocation class exists for each allocation value, beginning with the programmable maximum allocation value and ending with an allocation class zero. For example, where a programmable maximum allocation value is three, an existing store cache entry that is incremented three times since being allocated, the existing store cache entry, having an allocation value of three, belongs to allocation class three. Likewise, an existing store cache entry not incremented since being allocated, the existing store cache entry, having an allocation value of zero, belongs to allocation class zero.

Store cache 104 prioritizes one or more allocation classes for eviction (304). In the exemplary embodiment, store cache 104 prioritizes each of the allocation classes for eviction by selecting one or more allocation classes for eviction, based, at least in part, on a programmable eviction policy, marking each of the existing store cache entries belonging to the selected one or more allocation classes, and scheduling the selected one or more allocation classes for eviction, beginning with the highest allocation class first, followed by any remaining allocation classes in decreasing order. Store cache 104 selects one or more allocation classes for eviction, based, at least in part, on a programmable eviction policy, by referencing the programmable eviction policy to determine one or more allocation classes programmed for eviction, where the one or more allocation classes programmed for eviction has an associated eviction request. Store cache 104 marks each of the existing store cache entries belonging to the selected one or more allocation classes (i.e., the one or more allocation classes having an associated eviction request) by setting an eviction request function to "ON". Store cache 104 schedules the existing store cache entries associated with the programmable maximum allocation value, having an eviction request function set to "ON", for eviction first, followed by the existing store cache entries associated with the second highest allocation value, and so on. For example, where the maximum allocation value is three, each of the existing store cache entries belonging to allocation class three are the first of the existing store cache entries scheduled for eviction, followed by each of the existing store cache entries belonging to allocation class two, then each of the existing store cache entries belonging to allocation class one, and finally each of the existing store cache entries belonging to allocation class zero.

Store cache 104 sends the one or more allocation classes scheduled for eviction to an eviction request setting function of the programmable eviction policy (306). In the exemplary embodiment, store cache 104 sends the one or more allocation classes scheduled for eviction to the eviction request setting function of the eviction policy to complete the eviction request. The one or more allocation classes scheduled for eviction are one of a plurality of programmable parameters within the eviction request setting function used to complete the eviction request. Aspects of the programmable eviction policy are discussed in further detail with reference to FIG. 4.

Figure 4:
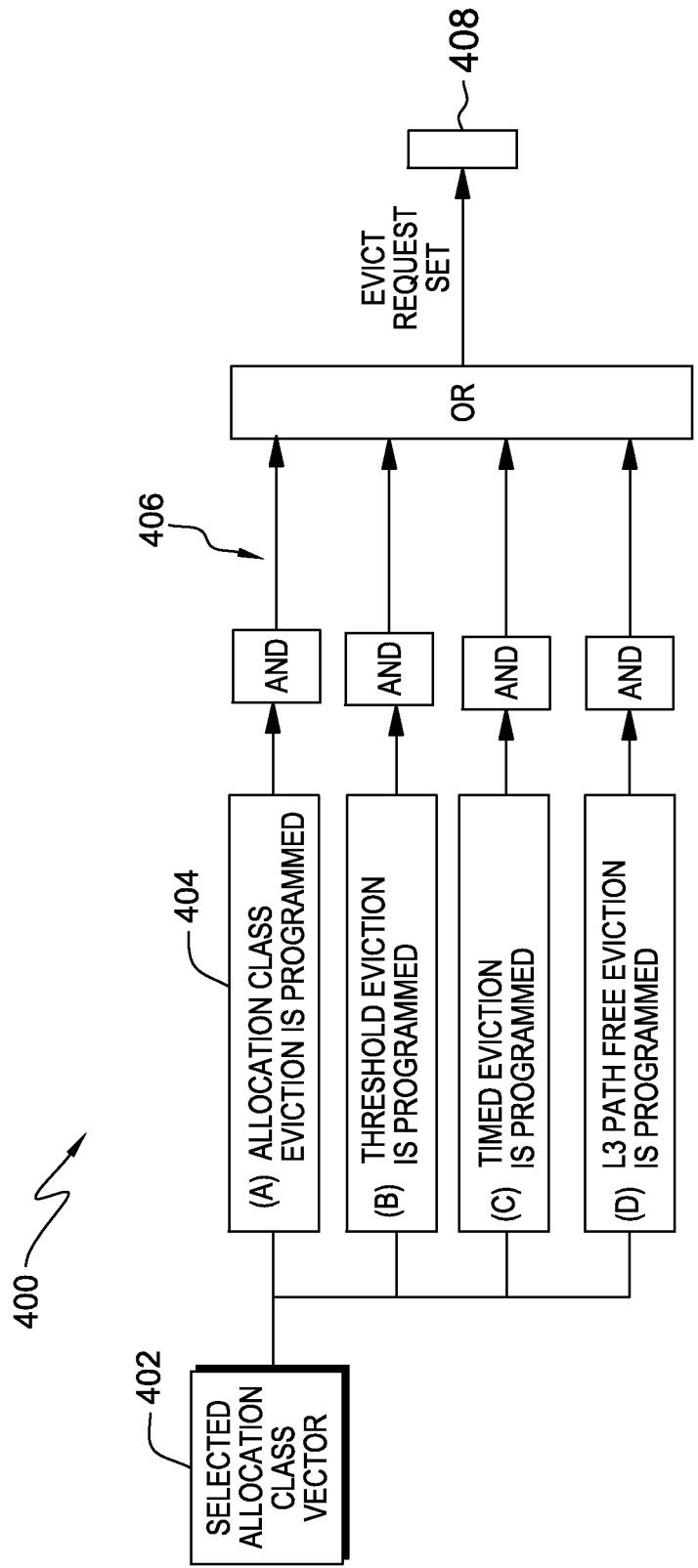
FIG. 4 is a functional block diagram, generally designated 400, illustrating a store cache eviction policy, in accordance with an embodiment of the present invention.

FIG. 4 is a functional block diagram, generally designated 400, illustrating an eviction request setting function of a programmable eviction policy, in accordance with an embodiment of the present invention.

Store cache 104 provides a programmable eviction policy for evicting existing store cache entries. In the exemplary embodiment, the programmable eviction policy provides the programmability of one or more parameters, including, without limitation, a number of new store cache entry allocations allowable before initiating an action (i.e., a new store cache entry allocation limit), and one or more allocation classes selected for eviction. The programmable eviction policy is configurable to evict one or more existing store cache entries based on varying store pressure. In one embodiment, the programmable eviction policy may include a plurality of default settings, such as evict the highest allocation class every 30 days. In the exemplary embodiment, the programmable eviction policy includes a configurable eviction request setting for evicting store cache entries.

Store cache 104 determines eviction request setting 408 by combining selected allocation class 402 with one or more of eviction request set reasons 404(*a*), 404(*b*), 404(*c*) and 404(*d*). Eviction set reason 404(*a*) initiates eviction of existing store cache entries belonging to the highest existing allocation class simply because this class exists, i.e., allocation class eviction is programmed. Eviction set reason 404(*b*) initiates eviction of existing store cache entries belonging to the highest existing allocation class when a programmable fill level (e.g., a predetermined threshold number of store cache entries) has been reached, i.e., threshold eviction is programmed. Eviction set reason 404(*c*) initiates eviction of existing store cache entries belonging to the highest existing allocation class after a programmable time has passed (e.g., 30 minutes or 30 days), i.e., timed eviction is programmed. Eviction set reason 405(*d*) initiates eviction of existing store cache entries belonging to the highest existing allocation class when a bandwidth limited path further down a cache hierarchy becomes free (e.g., when a path between an L2 cache, such as L2 cache 106 and an L3 cache (not shown) becomes free), i.e., L3 path free eviction is programmed.

In the exemplary embodiment, store cache 104 combines one or more of eviction request set reasons 404 together to establish a group of set reasons (406). The group of set reasons, when satisfied, triggers the eviction of one or more existing store cache entries belonging to a selected allocation class. In the exemplary embodiment, store cache 104 configures eviction request setting 408 according to the group of set reasons.

In the exemplary embodiment, store cache 104 provides the capability to configure a retention time for existing store cache entries in a range from one existing store cache entry with an allocation value zero up to a full store cache with each of existing store cache entries having a maximum allocation value. Store cache 104 provides the capability to handle a varying range of workloads by relieving store pressure through eviction of existing store cache entries.

FIG. 5 is a block diagram depicting components of a data processing system, in accordance with an embodiment of the present invention. It should be appreciated that FIG. 5 provides only an illustration of one implementation and does not imply any limitations with regard to the environments in that different embodiments may be implemented. Many modifications to the depicted environment may be made. Computer system 510 is one embodiment of data processor 100, shown in the form of a general-purpose computer device. The components of computer system 510 may include, but are not limited to, one or more processors or processing units 514, a system memory 524, and a bus 516 that couples various system components including system memory 524 to processor 514.

Bus 516 represents one or more of any of several different types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 510 typically includes a variety of computer system readable media. Such media may be any available media that is accessible by computer system 510, and includes both volatile and non-volatile media, removable and non-removable media.

System memory 524 can include computer system readable media in the form of volatile memory, such as random access memory (RAM) 526 and/or cache memory 528. Computer system 510 may further include other removable/non-removable, volatile/non-volatile computer system storage media. By way of example only, storage system 530 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 516 by one or more data media interfaces. As will be further depicted and described below, system memory 524 may include at least one computer program product having a set (e.g., at least one) of program modules that are configured to carry out the functions of embodiments of the invention.

Program/utility 532, having one or more sets of program modules 534, may be stored in memory 524 by way of example, and not limitation, as well as an operating system, one or more application programs, other program modules, and program data. Each of the operating systems, one or more application programs, other program modules, and program data, or some combination thereof, may include an implementation of a networking environment. Program modules 534 generally carry out the functions and/or methodologies of embodiments of the invention as described herein. Computer system 510 may also communicate with one or more external devices 512 such as a keyboard, a pointing device, a display 522, etc. one or more devices that enable a user to interact with computer system 510 and any devices (e.g., network card, modem, etc.) that enable computer system 510 to communicate with one or more other computing devices. Such communication can occur via Input/Output (I/O) interfaces 520. Still yet, computer system 510 can communicate with one or more networks such as a local area network (LAN), a general wide area network (WAN), and/or a public network (e.g., the Internet) via network adapter 518. As depicted, network adapter 518 communicates with the other components of computer system 510 via bus 516. It should be understood that although not shown, other hardware and software components, such as microcode, device drivers, redundant processing units, external disk drive arrays, RAID systems, tape drives, and data archival storage systems may be used in conjunction with computer system 510.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A method for determining eviction of store cache entries based on store pressure, the method comprising:
    determining, by one or more computer processors, a count value for one or more new store cache entry allocations;
    determining, by one or more computer processors, whether a new store cache entry allocation limit is exceeded;
    responsive to determining the new store cache entry allocation limit is exceeded, determining, by one or more computer processors, an allocation value for one or more existing store cache entries indicating an allocation class for each of the one or more existing store cache entries, wherein determining includes incrementing the allocation value of each of the one or more existing store cache entries by a value of one, beginning at an allocation value of zero and ending at a predetermined maximum allocation value, wherein incrementing occurs when allocation of one or more new store cache entries exceeds a programmable new store cache entry allocation limit, and counting a number of times each of one or more existing store cache entries has been incremented;
    determining, by one or more computer processors, based, at least in part, on the allocation value for the one or more existing store cache entries, at least one allocation class for eviction;

determining, by one or more computer processors, an eviction request setting for evicting the one or more existing store cache entries;

wherein determining an eviction request setting includes combining, by one or more computer processors, the at least one allocation class selected for eviction and one or more eviction set reasons, wherein the one or more eviction set reasons includes initiating eviction when a bandwidth limited path further down a cache hierarchy becomes free; and initiating, by the one or more computer processors, eviction for the one or more existing store cache entries belonging to the at least one allocation class selected for eviction, based, at least in part, on when the one of the one or more eviction set reasons is satisfied.

2. The method of claim 1, wherein determining a count value for one or more new store cache entry allocations, further comprises:

allocating, by one or more computer processors, one or more new store cache entries; and counting, by one or more computer processors, each of the one or more new store cache entry allocations.

3. The method of claim 1, wherein determining whether a new store cache entry allocation limit is exceeded, further comprises comparing, by one or more computer processors, the count value for the one or more new store cache entry allocations to the programmable new store cache entry allocation limit, wherein the programmable new store cache entry allocation limit is a predetermined threshold value that determines a number of new store cache entry allocations allowable before initiating an action.

4. The method of claim 3, wherein comparing the count value for the one or more new store cache entry allocations to the programmable new store cache entry allocation limit, further comprises determining, by one or more computer processors, the count value for the one or more new store cache entry allocations is greater than the programmable new store cache entry allocation limit.

5. The method of claim 1, wherein determining an allocation value for one or more existing store cache entries, further comprises counting, by one or more computer processors, the number of times each of the one or more existing store cache entries has been incremented.

6. The method of claim 1, wherein determining at least one allocation class for eviction, further comprises:

prioritizing, by one or more computer processors, based, at least in part, on a programmable eviction policy, the at least one allocation class, wherein the programmable eviction policy includes one or more of: a number of new store cache entry allocations allowable before initiating an action, at least one allocation class selected for eviction, and one or more eviction set reasons.

7. The method of claim 6, wherein prioritizing the at least one allocation class, further comprises:

selecting, by one or more computer processors, the at least one allocation class for eviction, based, at least in part, on the programmable eviction policy;

marking, by one or more computer processors, each of the one or more existing store cache entries belonging to the at least one allocation class selected for eviction; and scheduling, by one or more computer processors, the at least one allocation class selected for eviction, beginning with a highest allocation class first, followed by any remaining allocation classes in decreasing order.

* * * * *